(No Model.) 2 Sheets—Sheet 1.
W. T. MESSINGER.
APPARATUS FOR LIFTING AND CONTROLLING THE FLOW OF FLUIDS.
No. 334,793. Patented Jan. 26, 1886.
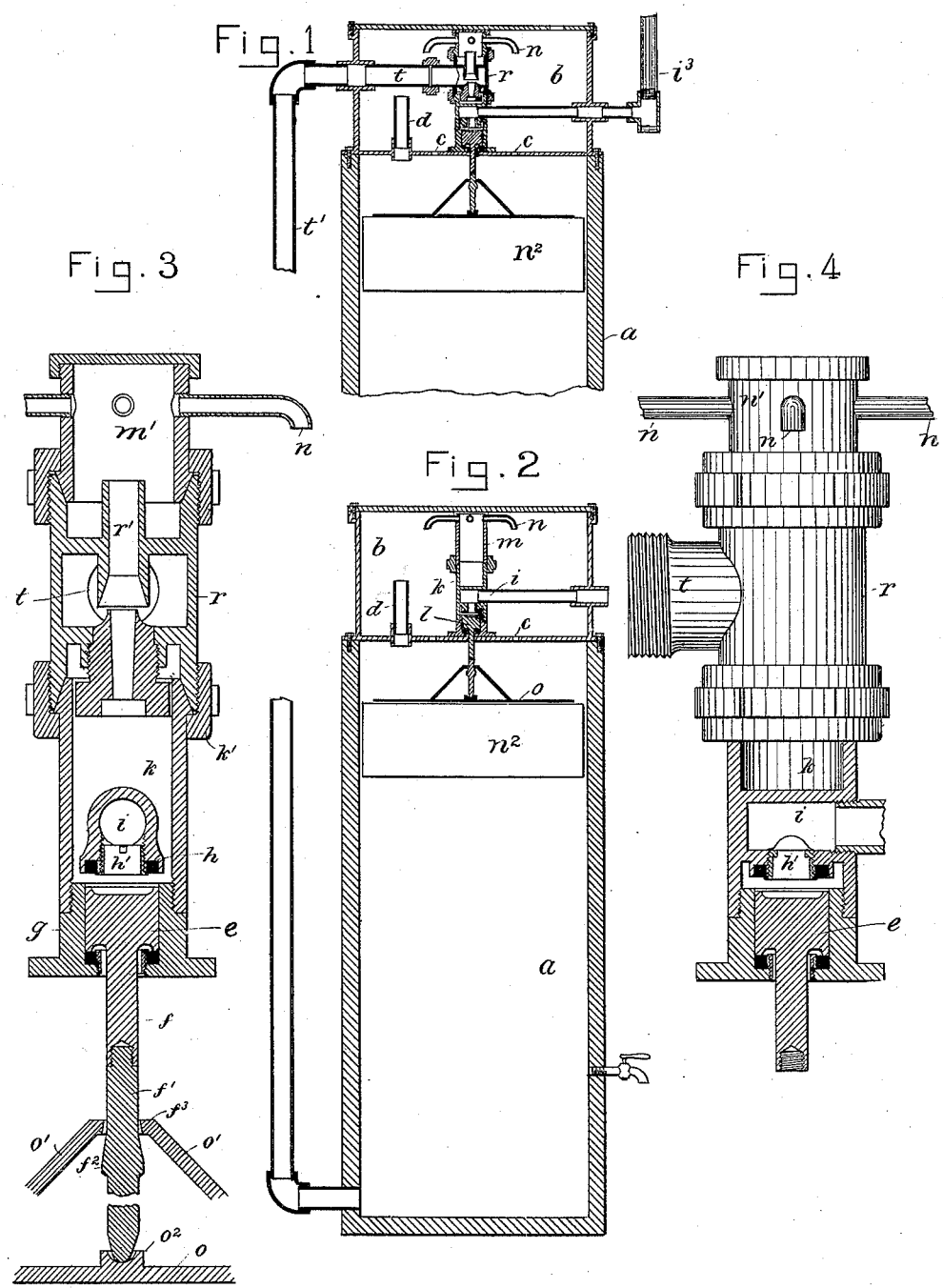

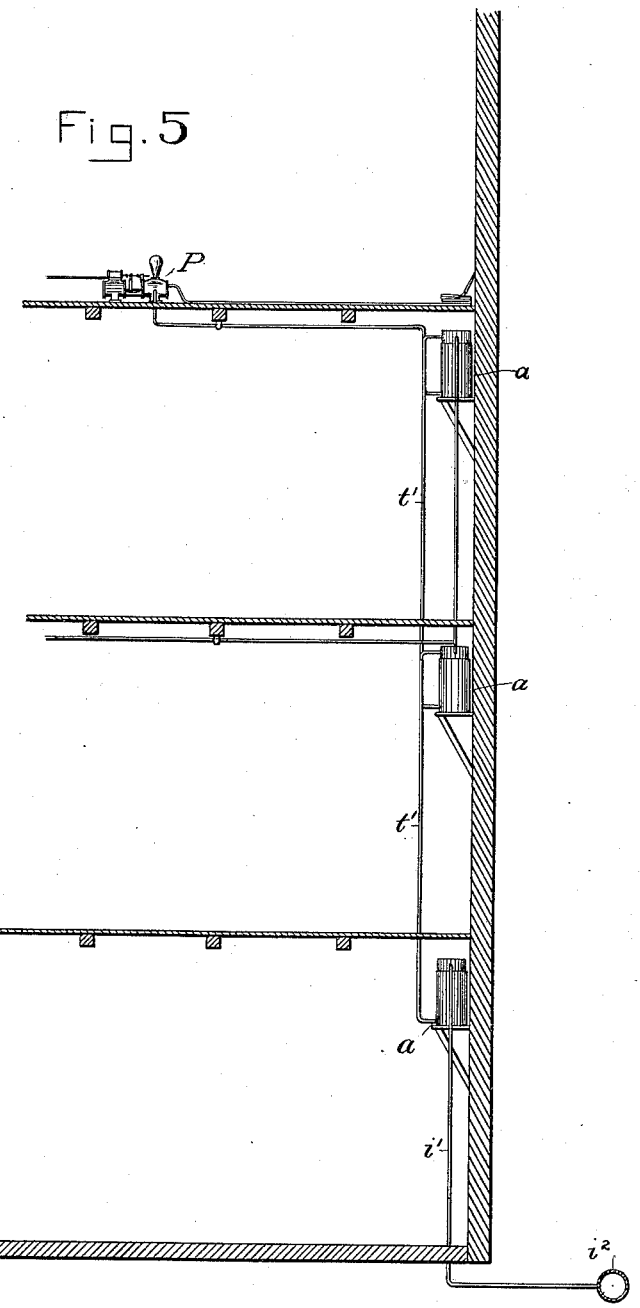

UNITED STATES PATENT OFFICE.

WILLIAM T. MESSINGER, OF CAMBRIDGE, MASSACHUSETTS.

APPARATUS FOR LIFTING AND CONTROLLING THE FLOW OF FLUIDS.

SPECIFICATION forming part of Letters Patent No. 334,793, dated January 26, 1886.

Application filed November 26, 1884. Serial No. 148,877. (No model.)

*To all whom it may concern:*

Be it known that I, WILLIAM T. MESSINGER, of Cambridge, county of Middlesex, and State of Massachusetts, have invented an Improvement in Apparatus for Lifting and Controlling the Flow of Fluids, of which the following description, in connection with the accompanying drawings, is a specification, like letters on the drawings representing like parts.

My invention relates to apparatus for lifting and controlling the flow of fluids of that class in which the liquid to be used is contained in a tank or reservoir to which liquid is automatically supplied in proportion as it is withdrawn, the flow of incoming liquid being automatically arrested when the tank or reservoir is sufficiently full.

The invention consists, partly, in a novel valve operated by a float supported on the liquid in the tank or reservoir to be kept full; and the invention further consists in the combination, with a tank or reservoir, of an ejector or lifting apparatus adapted to raise liquid from a lower level, and a valve controlled by the rise and fall of liquid in the said reservoir, whereby the lifting apparatus is set in operation when the liquid is removed from the reservoir and its operation is arrested as soon as the said reservoir is filled.

A structure or building may be provided with a series of tanks or reservoirs placed upon the different stories or at different levels in the building, the liquid being raised to the upper ones, if necessary, from the one below. When the liquid is supplied to the tank from a higher level or under sufficient pressure to enter the tank, the float-actuated valve controls the flow of the said liquid directly; but when the liquid is raised from a lower level by a lifting apparatus the valve controls the supply of actuating-fluid to the said lifting apparatus, cutting off the said supply, and thereby causing the operation of the lifting apparatus to cease when the tank is filled.

Figures 1 and 2 are longitudinal vertical sections of two tanks and connected appliances, the former being above the level to which the liquid will naturally rise; Fig. 3, a longitudinal section of an ejector and controlling-valve on a plane at right angles to that of Fig. 1 and on a larger scale; Fig. 4, an elevation, partly in section, of an ejecting apparatus on a plane at right angles to that of Fig. 3; and Fig. 5, a diagram showing a series of tanks arranged at different levels in a building, by which the liquid is raised to the different stories of the building and maintained at substantially the same pressure at each story.

The tank or reservoir $a$ may be of any suitable size or shape, each tank being placed in proper position to give the liquid issuing from it the desired pressure. The tank $a$ is surmounted by a chamber, $b$, connected by small openings $c$ with the tank below it, and also by a larger passage, $d$, consisting of a pipe rising above the bottom of the chamber $b$, the said pipe being the main delivery-passage from the chamber into the tank, and the openings $c$ constituting a secondary passage, the purpose of which will be hereinafter described. The flow of fluid is controlled by a valve, $e$, (best shown in Figs. 3 and 4,) having a stem, $f$, extending down into the tank $a$. The said valve $e$ has a longitudinal movement in a guide, $g$, by which movement it is placed upon or removed from a seat, $h$, surrounding a lateral orifice from a tubular passage, $i$, extending across a shell, $k$, into which fluid is admitted from the passage $i$ when the valve $e$ is removed from the seat $h$. The guide $g$ is provided with a valve-seat surrounding the stem $f$ of the valve, as clearly shown in Fig. 3, the valve $e$ coming to a bearing on this seat when it is removed from the seat $h$, and thus preventing the passage of fluid through the guide $g$ and around the stem into the reservoir $a$.

When the tank or reservoir is to be used in connection with a supply of liquid from a higher level than the tank, or under greater pressure than is desired for the liquid to be drawn from the tank, the said supply may be admitted directly to the passage $i$, as shown in Fig. 2, and at the lowest tank or reservoir $a$ in Fig. 5, which is shown as connected by $i'$ with a water-main, $i^2$. Under this construction the shell $k$ is surmounted by a tube or chamber, $m$, having outlets $n$, by which the liquid, when the valve $e$ is unseated, is discharged into the chamber $b$, the flow through the outlets $n$ being greater than that through the holes or secondary passage $c$, so that the liquid will rise in the chamber $b$ to the top of the pipe $d$, through which it may flow into the reservoir $a$ with as great rapidity as it is received through the passages $n$. The reservoir $a$ contains a float, $n^2$, which rises upon the liquid as the latter enters the said reservoir, until, when the latter is nearly full, it engages the stem of the valve $e$ or a bearing-plate, $o$, loosely connected therewith, raising the said valve against the seat $h$, to thus stop the flow of fluid from the inlet $i$. When the reservoir is above the level to which the supply of liquid will naturally flow, as shown in Fig. 1 and in the upper portion of Fig. 5, the inlet-passage $i$ is connected with a pipe, $i^3$, supplying steam or other fluid to operate a lifting apparatus, $r$, shown in this instance as an ejector of any suitable or usual construction, connected with the shell $k$, the liquid-inlet passage $t$ of said ejector being connected by pipe $t'$ with a suitable supply of liquid below—as, for instance, the lower end of another reservoir $a$ at a distance below not too great for raising the liquid by atmospheric pressure. The discharge-nozzle $r'$ of the ejector enters a chamber, $m'$, provided with the outlet $n$, entering the chamber $b$. In this construction, when the float $n^2$ rises and closes the valve $e$, the supply of steam is cut off from the ejector, which thus ceases to operate, so that no more liquid is discharged through the pipes $n$. The supply of liquid is thus cut off when the chamber $b$ is filled to the level of the top of the pipe or main passage $d$, and the liquid in the said chamber will then slowly pass through the holes or secondary passage $c$ into the reservoir $a$, thus increasing the upward pressure on the float $n^2$ and holding the valve $e$ tightly pressed against its seat, so that no leakage can occur. As shown in this instance, the shell $k$, with the inlet-passage $i$, is made in a single casting provided with a recess to receive a ring of yielding material, constituting the valve-seat $h$, which is held in place by a tubular nut, $h'$.

The shell $k$ is preferably constructed at its upper end to receive a coupling-nut, $k'$, by which either the cylinder $m$ or the ejector apparatus $r$ may be connected therewith, according as the liquid is supplied under pressure or has to be lifted to the reservoir, the cylinder $m$ and ejector $r$ thus being interchangeable.

The guide $g$ for the valve and the shell $k$ and devices connected therewith are supported on the top of the receiver $a$, and are held in place against the upward pressure of the float $n^2$ by the top or bonnet of the chamber $b$, which is provided with a vent or opening, so that the liquid in the reservoir $a$ and chamber $b$ is acted on only by atmospheric pressure. The portion $f$ of the valve-stem, connected directly with or forming part of the valve $e$, is provided with an extension, $f'$, having an enlargement, $f^2$, to engage and support a ring, $f^3$, connected by arms $o'$ with the bearing-plate $o$ for the float, having a socket, $o^2$, adapted to bear on the lower end of the valve-stem. The plate $o$ receives the upward pressure of the float $n^2$, transmitting it to the valve-stem and valve, the said plate being permitted to rock slightly with relation to the valve-stem, so as to come to a uniform bearing on the float $n^2$ and transmit its upward pressure directly to the valve without causing the latter to bind. When liquid is removed from the reservoir $a$, the float $n^2$ sinks, permitting the valve $e$ to open, and leaving the bearing-plate suspended from the valve-stem by the ring $f^3$ engaging the enlargement $f^2$; and by the opening of the valve $e$ the liquid is again permitted or caused to enter the chamber $b$ and reservoir $a$ until the latter is again filled, when the further supply of liquid will be cut off. It will be seen that but a very slight movement of the float is required to cause the opening or closing of the valve $e$, and that the liquid is permitted to flow at maximum rate until the float reaches the bearing-plate or valve-stem, when the flow is almost immediately wholly arrested and leakage or overflow prevented by the further pressing of the valve against its seat, owing to the buoyant force of the float produced by the liquid passing through at holes $c$. This is of great advantage over most of the float-valves in use in which the valve is opened and closed gradually as the float rises and falls.

Fig. 5 illustrates a building provided with a series of tanks, $a$, the lower one only of which is supplied by the liquid entering under pressure, while the upper one is shown as affording a supply for a pump, P, which is shown as above the level to which the water could be raised by atmospheric pressure, as, in other words, by the suction of the pump. In this arrangement, when the liquid is drawn from any one of the reservoirs $a$, the valve $e$ of the said reservoir will be opened, permitting liquid to be raised to the said tank from the next one below it, and the latter in turn, when its contents are removed to supply the one above, will cause its own valve to be opened and a supply to be raised from the one below. The tanks $a$ at the different levels are thus all automatically maintained filled with liquid.

I claim—

1. An apparatus for raising liquids, comprising a series of reservoirs at different levels, combined with a lifting apparatus at each higher reservoir, having a suction-pipe extending to a lower reservoir and entering the same below the normal level of the liquid therein, and a valve controlled by the fluid in each reservoir, which stops the action of the lifting apparatus when the liquid raised by it from a lower reservoir reaches the predetermined normal level in the reservoir corresponding to the said lifting apparatus, and into which the latter discharges, substantially as and for the purpose described.

2. The tank or reservoir and chamber surmounting it, provided with small and large passages into the reservoir from lower and higher levels, respectively, combined with a supplying device discharging into the said chamber in greater volume than can be delivered through the small passages, a valve controlling the supply of liquid to the chamber, and a float operating the said valve controlled by the liquid in the said reservoir, an additional amount of liquid being introduced to the tank from the chamber through the small passages after the flow into the chamber has been stopped, substantially as and for the purpose described.

3. The tank or reservoir having a fluid-inlet passage and a float in said tank, combined with a valve controlling the said inlet-passage and a bearing-piece loosely connected therewith, affording a large area which receives the buoyant pressure of the float and transmits it to the valve, substantially as described.

4. The tank or reservoir and chamber surmounting it, provided with a main passage leading from a level above the bottom of the chamber to the tank and secondary passages from a lower level in the chamber, combined with a lifting apparatus, which, when in operation, raises a liquid from a lower level and discharges it into the said chamber, from which the said liquid is delivered through the main passage into the reservoir, a valve controlling the operation of the said lifting apparatus, and a float operating the said valve, controlled by the liquid in the said reservoir, an additional amount of liquid being introduced to the tank from the chamber through the secondary passages after the flow into the chamber has been stopped, substantially as and for the purpose described.

5. A tank or reservoir and fluid lifting and controlling apparatus surmounting it, composed of a shell having a lateral steam-inlet passage, with a downwardly-directed orifice provided with a valve-seat, the said shell having connected with it a steam-nozzle and combining-tube constituting an ejector for raising a liquid from a lower level, combined with a valve controlling the said steam-orifice and a float in the said reservoir, governing the operation of the said valve, substantially as described.

6. A tank or reservoir and fluid controlling apparatus surmounting it, containing a fluid-inlet passage with a downwardly-opening orifice and a valve-seat surrounding the same, combined with a valve and guide therefor below the said orifice, the said valve having a stem extending downward toward the reservoir and a guide having a seat surrounding the said stem, which receives the valve when removed from the seat around the orifice, substantially as described.

In testimony whereof I have signed my name to this specification in the presence of two subscribing witnesses.

WM. T. MESSINGER.

Witnesses:
JOS. P. LIVERMORE,
W. H. SIGSTON.